United States Patent Office 2,758,870
Patented Aug. 14, 1956

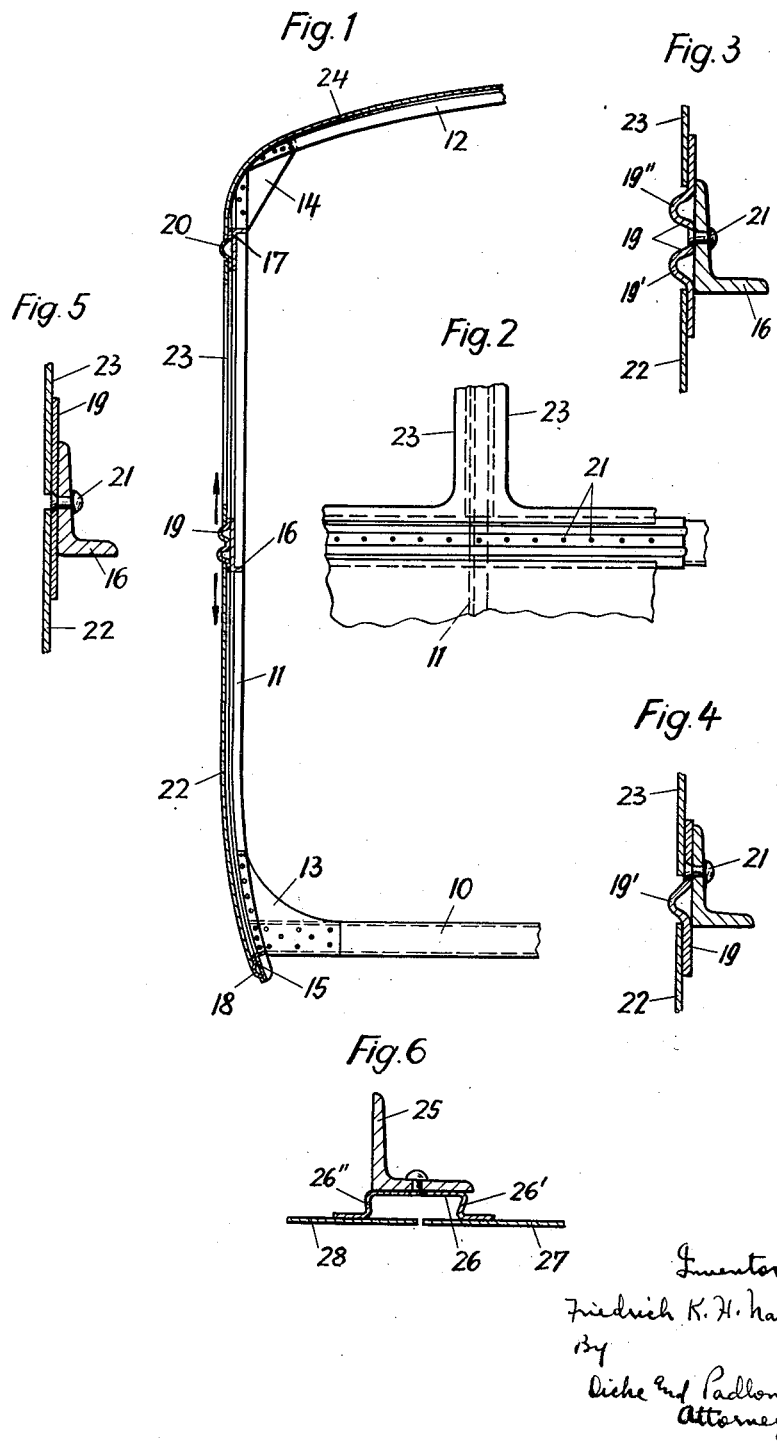

2,758,870

ARRANGEMENT FOR FASTENING THE BODY WALLS TO THE FRAME OF A MOTOR VEHICLE

Friedrich K. H. Nallinger, Stuttgart, Germany, assignor to Daimler-Benz Aktiengesellschaft, Stuttgart-Unterturkheim, Germany Application January 19, 1951, Serial No. 206,760

Claims priority, application Germany January 9, 1950

8 Claims. (Cl. 296—28)

The present invention relates to bodies of vehicles, and more particularly to bodies of motor vehicles, especially to those of which only a relatively restricted number is to be manufactured.

In the case of vehicle bodies, of which only a relatively small number is manufactured, it often will not pay to manufacture the body parts by pressing, since the cost of the dies and the use and depreciation thereof is less economical with restricted series manufacture. On the other hand, the conventional combined method of manufacture of wood and sheet metal will produce vehicles of relatively heavy weights which is equally undesirable.

Accordingly, it is an object of the present invention to provide an arrangement and method of manufacturing which results in a vehicle body of as light a weight as possible, especially as compared with a body formed of a wooden frame, but which at the same time is of stability similar to that of a body constructed rigidly throughout.

A further object of the present invention is to provide a manufacturing method which may be practiced relatively cheaply and economically even in case of manufacture of restricted series, particularly by the fact that such manufacture will require a relative minimum of preparation which enables very rapid manufacture of such vehicle bodies.

A further feature of the present invention resides in that intermediate members are secured, preferably by riveting, to the profile supporting members of a supporting frame which may be made, for example, of cast or drawn light-weight metal, such as aluminum and magnesium and alloys thereof. The intermediate members may be formed of sheet metal strips so that the body's outer cover or panels may be fixed thereon by any of the conventional methods, such as welding, grooving, or gluing.

A further feature of the present invention resides in the fact that the intermediate members or sheet metal strips are made of steel plate material so as to permit welding of the outer body cover or panels thereon, if the outer body cover or panels are also made of steel.

A still further object of the present invention is to provide an arrangement for securing the outer body cover walls or panels, such as sheathing, to the frame of the vehicle, even if different materials are used for the sheathing and the frame, which ordinarily can only be secured to each other by means of welding, at best in a very difficult manner. If, for example, the outer body walls are made of steel sheathing and light metal profile supporting members made of aluminum or magnesium or their alloys, then a direct welding between the outer body sheathing and the frame becomes practically impossible.

A still further object of the present invention resides in the provision of a connection between the frame and the outer body cover of motor vehicles which compensates for the unequal expansion of the two different materials used in connection therewith as described above, which compensation is rendered possible by the use of a resilient connection, for example, by the use of appropriately formed intermediate members, thereby avoiding any warping or distortion of the body wall.

It is another object of the present invention to provide an arrangement for fastening the outer body paneling to the framework of the motor vehicle which permits the use of conventional fastening methods, such as welding, which would otherwise be very difficult, if not impossible, to use because of the particular material used for the frame and/or of the vehicle body panels or walls such as light-weight metals, for example, aluminum, magnesium, and their alloys, which do not lend themselves readily for such fastening methods.

Another object of the present invention resides in the provision of a fastening arrangement for outer body walls or panels to the frame of the vehicle in case of the use of lightweight metals, as described above, for both the outer walls and the frame of the vehicle. In that case the intermediate members are also suitably made of lightweight metal or alloys thereof, however of a type which may be more readily joined, for example, by means of welding, to the outer paneling, and which can be fastened to the frame by riveting. As the case may be, it will even be satisfactory to have the supporting frame formed only in part of light metal profile members, while, as to the remaining parts, it may comprise pressed steel pieces or wooden members, which, for example, are glued or pressed thereon.

It is another object of the present invention to provide a method and means for securing an outer body covering formed of walls or panels made of steel sheet metal or light metal, such as aluminum, magnesium and the alloys thereof, to a frame made of light metal, such as aluminum, magnesium and alloys thereof, which produces a neat external appearance obtained, for example, by welding as contrasted to riveting, and which compensates for the difference in expansion of any dissimilar metals used in such construction.

Further objects, features, and advantages of the present invention will become obvious from the following description when taken in connection with the accompanying drawing, which shows, for purposes of illustration only, several preferred embodiments of the present invention and wherein:

Figure 1 is a cross-sectional view through the lateral part of a vehicle body constructed according to one embodiment of the present invention.

Figure 2 is a side view of a portion of the side wall structure shown in Figure 1.

Figure 3 is a cross-sectional view on an enlarged scale of a connecting arrangement of the outer body walls to the supporting frame according to the construction of Figures 1 and 2, and Figures 4, 5, and 6 illustrate cross-sectional views similar to that of Figure 3, of different embodiments for connecting the outer body walls to the vehicle frame.

Referring now more particularly to the drawing, wherein like reference numerals are used throughout the various views to designate like parts, and more particularly to Figures 1 and 2, reference numerals 10, 11, and 12 designate the profile supporting members forming the transverse girders of the supporting frame which members are connected to each other in any suitable manner, as for example, by sheet metal reinforcing members 13 and 14. The profile supporting members 10, 11, and 12 are also connected to the longitudinal profile supporting members 15, 16, and 17 in any suitable manner. For example, butt welding may be used to connect the same to the transverse girders. The profile supporting members 10, 11, and 12 as well as the sheet metal reinforcing members 13 and 14 may be made, for example, of cast or drawn light metal, such as aluminum, magnesium, and alloys thereof.

The intermediate members or sheet metal strips 18, 19, and 20, illustrated on an enlarged scale on Figure 3, are secured to the profile supporting members, for example, to the longitudinal supporting members 15, 16, and 17, by rivets 21. The sheet metal strips are provided with corrugations of which the sheet metal strip 19 has, for example, two corrugations 19' and 19", while the sheet metal strips 18 and 20 have only one such corrugation each. The wall parts or panels 22, 23, and 24 of the outer body cover are supported on the flat ends of the sheet metal strips, and are connected thereto, for example, by any known method of welding, such as spot welding, progress welding, butt welding, burning-off welding, etc. The sheet metal strips, as well as the body cover may be made, for example, of steel plates or sheathing of predetermined gauge.

By reason of the construction of the vehicle body having sheet metal strips interposed between the frame and the body cover or panels, it is possible to provide for the use of conventional and suitable welding methods of the cover to the frame even in case of a light metal frame and a cover made of steel, thereby resulting in a construction which is both satisfactory as to rigidity and external appearance. The use, for example, of conventional profile supporting members permits a simple and cheap manufacture of the frame. The corrugations, such as 19' and 19", thereby serve to compensate for the different coefficients of expansion of the light metal and the steel used for the frame and body cover respectively when exposed to heat. For example, when the light metal frame extends under heat, the sheet metal strip 19 may also slightly extend in the directions of the arrows, as shown in Figure 1, thereby preventing warping or distorting the vehicle body covering.

Instead of integral metal strips 18, 19, and 20 some sheet metal or intermediate members may be provided in various places for securing or fastening the vehicle body covering. Furthermore, the different parts may be arranged and located in such a way as to enable longitudinal as well as transverse extensions or expansions of the body covering or of the wall or paneling parts thereof with respect to the frame. Instead of corrugations, the compensation for the differences in the relative expansions may also be effected, for example, by means of slots or any other resilient arrangement of the sheet metal strips or intermediate members, or in any other suitable way.

Instead of providing a compensating element on both ends of each wall or paneling part of the outer body cover 22 and 23, eventually one compensating element may be provided only at one end.

A construction suitable for this last-mentioned condition is shown, by way of example, in Figure 4 wherein the sheet metal strip 19 is provided with only one corrugation 19' for the covering sheet metal part 22 while the other outer body panel or part 23 is directly and flatly applied to the frame and, consequently, cannot give way at that end with respect to the frame.

It is also possible to provide compensation for unequal expansion, for example, only at 18 and 20, so that a simple sheet metal strip 19 as shown in Figure 5 may be used.

Fig. 6 illustrates another embodiment in accordance with the present invention in which an intermediate sheet metal member 26 is riveted to the profile member 25, which intermediate member 26 has its ends 26' and 26" bent outwardly in the shape of an S to be welded thereat to the panels or walls 27 and 28. The panels in that case may overlap each other so as to provide the appearance of an uninterrupted integral outer body covering. The intermediate members 26 and the outer cover panels 27 and 28 may again be made of steel plate or sheathing of predetermined gauge.

Instead of welding, the body covering may be connected to the sheet metal strips or intermediate members by means of gluing, grooving, or the like. If the difference in expansion by heat may be neglected, or if this difference is compensated for in another manner, then the sheet metal strips or intermediate members may be generally manufactured without corrugations, for example, as shown in Figure 5, particularly if both the frame with the intermediate members or sheet metal strips and the outer body covering are made of similar material, such as, light metal. In the last-described case, it is preferable to use also a light-weight metal for the intermediate members of the type which lends itself more readily to welding with the outer body panels than the light-weight material of the frame members.

This invention is not restricted to the embodiments described hereinabove but may be varied within the scope of the various features of the present invention as defined by the appended claims.

In the claims:

1. A vehicle body having a framework of light-metal and a body sheathing of a metal not or only difficultly weldable with the light-metal of the framework, comprising intermediate metal strips located intermediate said body sheathing and said light metal framework, said intermediate strips being riveted to the outside of said light-metal frame and being fastened to the inside of said sheathing by bonding.

2. A vehicle body having a framework of light metal selected from the group consisting of aluminum, magnesium, and the alloys thereof and a steel body sheathing comprising intermediate strips of sheet steel disposed between said framework and said steel body sheathing, said intermediate strips being riveted to the outside of said light-metal frame and being connected to the inside of said sheathing by welding.

3. A vehicle body, according to claim 1, wherein said intermediate metal strips are shaped to provide resilient characteristics.

4. A vehicle body, according to claim 3, wherein said intermediate metal strips are provided with corrugations to produce the resilient characteristics.

5. A vehicle body having a framework of light-weight metal and a body sheathing of light-weight metal comprising intermediate metal strips located between said light-weight metal framework and said body sheathing, said intermediate metal strips being riveted to the outside of said light-weight metal frame and being connected with the inside of said sheathing by gluing.

6. A vehicle body having a framework made of light metal selected from the group consisting of aluminum, magnesium, and the alloys thereof and a body covering formed of metal sheathing at best only difficultly weldable with the light metal of the framework comprising means including metal strips for connecting said covering to said framework, said metal strips including means for compensating for the difference in the coefficient of expansion of the metal of said framework and of the metal of said covering, and said metal strips being riveted to the outside of said framework and being bonded to the inside of said covering.

7. An arrangement for connecting the outer covering formed of metal sheathing to the framework made of light-weight metal of a vehicle body in which the sheathing ordinarily is not or at best only difficultly weldable with the light-weight metal of the framework comprising intermediate metal strips riveted to said framework and welded to the inside of said sheathing, said metal strips being formed of a metal more readily weldable with said sheathing.

8. The combination according to claim 7 wherein said intermediate strips comprise means for compensating for the unequal expansion in the different metals used for the framework and the sheathing.

(References on following page)

References Cited in the file of this patent

UNITED STATES PATENTS

| | | |
|---|---|---|
| 1,669,690 | Brandl | May 15, 1928 |
| 2,183,563 | Hart | Dec. 19, 1939 |
| 2,196,939 | Perkins | Apr. 9, 1940 |
| 2,223,740 | Quest | Dec. 3, 1940 |
| 2,304,718 | Swart | Dec. 8, 1942 |
| 2,319,675 | Grinter | May 18, 1943 |
| 2,330,182 | Theriault | Sept. 21, 1943 |
| 2,376,854 | Saunders et al. | May 22, 1945 |
| 2,411,226 | Pehrson | Nov. 19, 1946 |

FOREIGN PATENTS

| | | |
|---|---|---|
| 308,042 | Great Britain | Mar. 21, 1929 |
| 422,642 | Great Britain | Jan. 16, 1935 |
| 71,717 | Norway | Feb. 17, 1947 |
| 72,033 | Norway | Apr. 28, 1947 |